June 13, 1972  G. H. BOWSER ET AL  3,669,785
METHOD FOR FABRICATING A MULTIPLE GLAZED UNIT
Filed March 26, 1970  2 Sheets-Sheet 1

INVENTORS
GEORGE H. BOWSER
VERNON A. SHOOP
STANLEY J. PYZEWSKI
RENATO J. MAZZONI
JOHN P. BOLOGNA

BY Chisholm Spencer
ATTORNEYS

June 13, 1972   G. H. BOWSER ET AL   3,669,785
METHOD FOR FABRICATING A MULTIPLE GLAZED UNIT
Filed March 26, 1970   2 Sheets-Sheet 2

INVENTORS
GEORGE H. BOWSER
VERNON A. SHOOP
STANLEY J. PYZEWSKI
RENATO J. MAZZONI
JOHN P. BOLOGNA
BY
ATTORNEYS

United States Patent Office 3,669,785
Patented June 13, 1972

3,669,785
METHOD FOR FABRICATING A MULTIPLE GLAZED UNIT
George H. Bowser, New Kensington, Vernon A. Shoop, Springdale, Stanley J. Pyzewski and Renato J. Mazzoni, Tarentum, and John P. Bologna, Leechburg, Pa., assignors to PPG Industries, Inc., Pittsburgh, Pa.
Filed Mar. 26, 1970, Ser. No. 22,762
Int. Cl. C03c 27/10
U.S. Cl. 156—109                                    1 Claim

ABSTRACT OF THE DISCLOSURE

A method for fabricating multiple glazed units from a composite element composed of an elongated strip of mastic sealant material having a flexible carrier tape adhered to one surface and a resilient spacer-dehydrator element adhered to the opposite surface. The composite element, described above, is assembled and suitably packaged for use, shipment or storage. Thereafter, a segment of said element is removed from the package, inserted between opposed, marginal edge portions of a pair of spaced glass sheets and sealed by said mastic to produce a finished unit.

BACKGROUND OF THE INVENTION

This invention relates to fabricating multiple glazed units from segments of a composite hermetic sealant, spacer-dehydrator element. More specifically, the invention relates to fabricating such units from a composite element comprising an elongated strip of mastic sealant material having a flexible carrier tape or the like adhered to one surface and a resilient spacer-dehydrator element adhered to the opposite surface. In particular, the invention relates to providing the above-described composite element in a suitable package and then, at any desired fabrication site, removing segments of said element from the package and producing multiple glazed units therefrom.

In application Ser. No. 749,758, now abandoned, the disclosure of which is specifically relied upon and incorporated herein by reference, there are shown and described multiple glazed window units comprised of a pair of glass sheets spaced from each other along their opposed marginal edge portions by an elastomeric spacer-dehydrator element and having a mastic sealant disposed about the peripheries of the glass sheets and the spacer-dehydrator element to provide a hermetically sealed unit. In accordance with the foregoing invention, the spacer-dehydrator element is preferably composed of a desiccant material dispersed in a matrix of moisture vapor transmittable styrene-butadiene rubber.

In accordance with the present invention, it has now been discovered that it is possible to package or coil continuous, pre-assembled lengths of the required spacer-dehydrator and sealant components of the above-described units at one location for use or temporary storage at that location or for shipment to and use or temporary storage at a distant multiple glazed window fabrication site. More particularly, in accordance with this invention, it has been discovered that it is possible to package continuous lengths of the composite hermetic sealant, spacer-dehydrator element in a coil for use, shipment or storage, and thereby provide a continuous coil or length of the composite element from which shorter lengths can be removed as needed in the construction of multiple glazed units.

Among the requirements that had to be met in connection with this invention were: providing continuous, pre-assembled lengths of the composite element in a compact package; maintaining the pre-assembled disposition or physical arrangement of the components of the composite element both in the package and when subsequently withdrawn therefrom for use; preventing or minimizing moisture pick-up by the desiccant during shipment and/or storage; and protecting room temperature vulcanizable or curable sealants against curing after packaging and during shipment and/or storage. The present invention makes the achievement of each of the above-enumerated requirements or objectives possible by providing a novel and unique arrangement for preparing the composite element for use, shipment or storage.

In accordance with the present invention, the composite carrier tape or ribbon, hermetic sealant, spacer-dehydrator element is coiled about a corepiece with the flexible carrier tape in nearest adjacency to the corepiece. For some reason, which is not completely understood, if the composite element is coiled with its spacer-dehydrator component nearest the core, the spacer-dehydrator moves relative to the hermetic sealant causing the spacer-dehydrator to assume a wavy or undulatory disposition with respect to the sealant along substantial portions of the length of the composite element. This latter condition, of course, would defeat one of the principal objectives of this invention, i.e., continuously maintaining the pre-assembled disposition of the components of the composite element. Surprisingly, however, it has been discovered that by coiling the composite element with the carrier tape or ribbon nearest the core, the occurrence of this waviness condition is obviated. Accordingly, the packaging arrangement of the present invention permits maintaining the pre-assembled disposition or physical arrangement of the component parts of the composite element both in the package and when subsequently withdrawn therefrom for use. Moreover, the coiling arrangement of this invention provides a compact package for economy in shipment and/or storage and also provides a continuous roll or coil of spacer-sealant material from which a desired segment can be removed as needed.

In addition, in accordance with this invention, it has been discovered that moisture pick-up by the desiccant can be minimized or prevented and that room temperature vulcanizable sealants can be protected against curing during shipment and/or storage by maintaining the composite spacer-sealant element in a cooled, dry, inert atmosphere, such as is provided by the presence of Dry Ice in the package. The Dry Ice maintains the ambient temperature of the environment around a room temperature vulcanizable sealant below that at which the sealant will cure and also aids, by vaporization of the Dry Ice, in providing a relatively moisture-free, inert atmosphere that precludes any significant pick-up of moisture by the desiccant material.

The foregoing and other objects, features and advantages of this invention will become more apparent from the description that follows when taken in conjunction with the drawing, in which.

Figure 1:
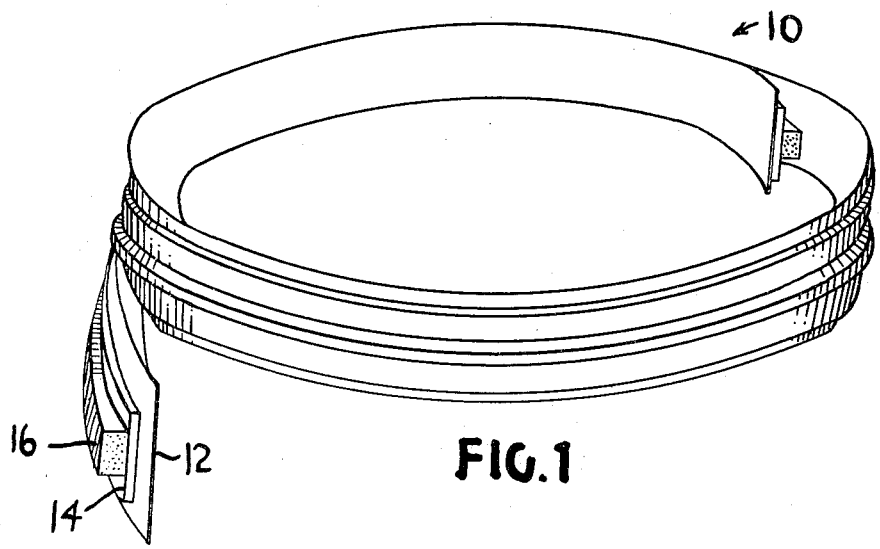
FIG. 1 is a perspective view of a section of a composite carrier ribbon-sealant-spacer element coiled in accordance with this invention.

Illustrated in FIG. 1 is a length of a composite hermetic sealant, spacer dehydrator element 10 coiled in accordance with the present invention and comprising a flexible carrier tape or ribbon 12 having an elongated strip of mastic material 14 adhered to one side thereof and a resilient spacer-dehydrator element 16 adhered to the mastic material. As shown, ribbon 12 is preferably slightly wider than the strip of mastic 14 and the strip of mastic 14 is wider than spacer-dehydrator 16. Each of the elements 12, 14 and 16 are coextensive in length and generally symmetrically disposed on either side of a center line along the length of the composite element 10.

Figure 3:
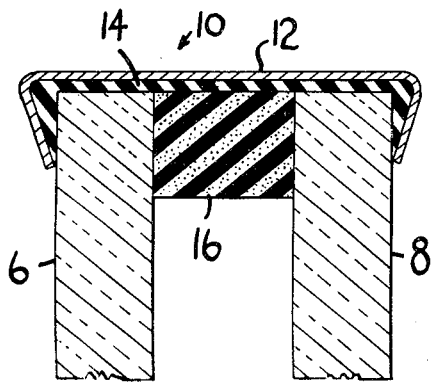
FIG. 3 is a cross section of a marginal edge portion of a typical multiple glazed unit within the contemplation of this invention.

In the construction of multiple glazed units, such as illustrated by the cross section shown in FIG. 3, a continuous length of spacer-sealant assembly 10 is placed around the periphery of a pair of spaced, parallel glass sheets 6 and 8 to provide an insulating air space between the sheets. The glass sheets are thus separated at their marginal edges by the continuous spacer-dehydrator element 16 and hermetic sealing of the insulating air space is accomplished by the moisture-resistant mastic 14 being adhered or bonded to the peripheral edge of spacer-dehydrator element 16 and the peripheral edges of the glass sheets. A hand roller may be conveniently used to press mastic 14 into sealing contact with the edges of the glass sheets and any flowing of mastic 14 that may occur is intended to be concealed by the slightly greater width of ribbon 12 over the original width of mastic strip 14.

For use in connection with this invention, carrier ribbon 12 may be composed of any flexible material, although a moisture-resistant material is preferred. In the particular embodiment shown, for example, ribbon 12 is a strip of 5–6 mil aluminum foil. However, a strip of flexible moisture-resistant plastic or other flexible, moisture-resistant material may also be used, if desired.

Adhesive, moisture-resistant mastic compositions 14, within the contemplation of this invention, are materials that are capable of cold flow at room temperature and include precured materials, such as disclosed in U.S. Pat. No. 2,974,377, as well as thermosetting and/or room temperature curable materials, such as disclosed in U.S. Pat. Nos. 3,076,777 and 3,320,333. Room temperature curable materials that cold flow to form a seal and cure to form a resilient structural bond are particularly desirable for use as an "edge-packing" or hermetic sealant in the construction of multiple glazed units.

Spacer-dehydrator 16 is a flexible or resilient member the preferred composition of which is fully disclosed in the aforementioned application Ser. No. 749,758. Briefly, spacer-dehydrator 16 is preferably comprised of a powdered molecular sieve material dispersed in a matrix of a thermoplastic styrene-butadiene rubber. Reference may be had to the aforesaid copending application Ser. No. 749,758 for further details regarding spacer-dehydrator 16, its method of manufacture and ultimate use in multiple glazed window constructions.

Thus, the spacer assembly 10 contains three different materials which are aligned in the manufacturing process. During shipment and/or storage, the spacer assembly must retain this alignment and be kept dry. This is esesntial for fabricating good units from the spacer assembly. For example, if the spacer-dehydrator 16 moves in relation to the sealant 14 and foil 12, it will be impossible to obtain the required fit and seal around the marginal edge of the unit. Also, if the spacer-dehydrator 16 is in contact with moisture, it will lose its drying capacity. Moreover, maintaining the spacer assembly in a cool and/or cold ambient environment, during shipment or storage, is desirable in order to retard the cure of heat and room temperature curable or vulcanizable mastic sealants.

Figure 2:
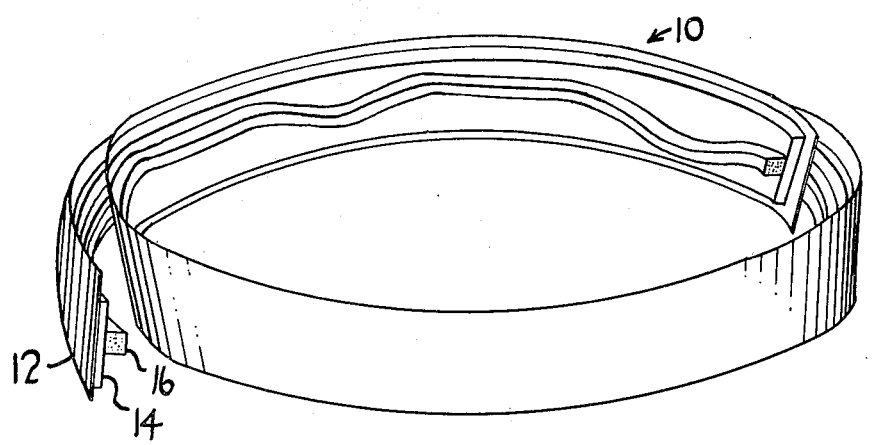
FIG. 2 is a perspective view, similar to FIG. 1, of a section of a composite carrier ribbon-sealant-spacer element and depicting the wavy condition that occurs with the spacer component when this component of the composite element is disposed nearest the center of the coil.

In accordance with the present invention, after composite element 10 has been prepared or assembled in continuous strip form it is wound into a flat, cyclindrical coil with the side of the carrier ribbon or foil 12 that is free of mastic 14 being disposed nearest the center of the coil. This coiling arrangement is illustrated in FIG. 1. By way of comparison, the reverse arrangement for coiling composite element 10 is illustrated in FIG. 2. Also illustrated in FIG. 2 is the undesirable movement or misalignment of spacer-dehydrator 16 relative to mastic 14 that results by reason of coiling composite element 10 in the manner shown therein rather than the manner shown in FIG. 1. However, when spacer element 10 is coiled in the manner shown in FIG. 1, the alignment of spacer-dehydrator 16 relative to mastic 14 and foil 12 is maintained and good units can consistently be produced without difficulty in obtaining the required seal around the marginal edges of the units.

Figure 4:
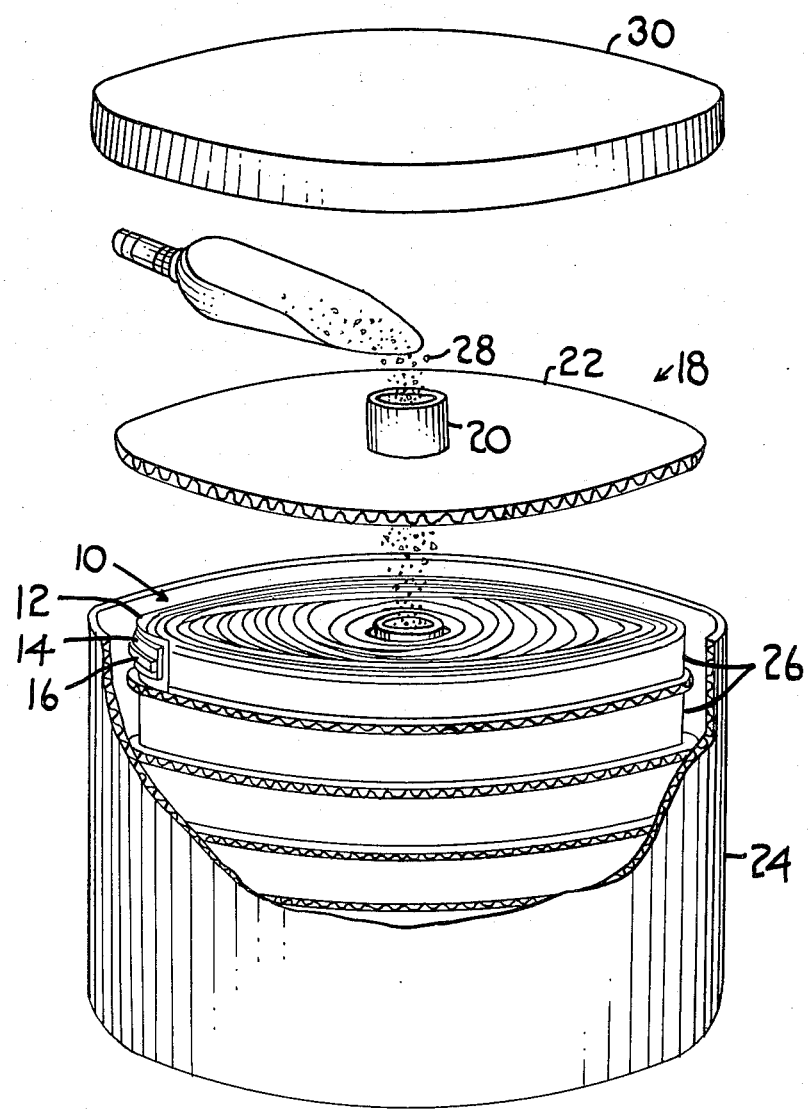
FIG. 4 is an exploded, perspective view of a preferred shipping or storage packaging arrangement of this invention.

Depicted in FIG. 4 is an exploded view of a preferred packaging arrangement in accordance with this invention. Spacer-sealant assembly 10 is coiled on a support or frame 18 composed of a hollow cylindrical hub or core member 20 having a circular rim 22 affixed about one of its ends. Spacer-sealant assembly 10 is wound about core member 20 so that foil 12 faces toward the core and spacer-dehydrator 16 faces away from the core. After the desired length of spacer-sealant assembly 10 is wound or coiled on frame 18, the frame and spacer-sealant assembly are placed in a cylindrical box 24 having an inside diameter slightly larger than the outside diameter of rim 22. As shown, a plurality of these coils 26 may be stacked one on top of the other in box 24 until the box is filled. Then, Dry Ice 28, either packaged or in loose pieces, is preferably placed in the cylindrical hollow provided by the stack of core members 20. Lid 30 is thereafter placed on box 24 and the completed package is sealed for shipment and/or storage until needed.

At the fabrication site, a pair of glass sheets 6 and 8 are cut to size and cleaned with alcohol and water. Then, one sheet of glass is supported in opposed, spaced relation above the other so that the separation between the sheets is slightly wider than spacer-dehydrator 12. A package or coil 26 of spacer-sealant assembly 10 is provided from storage and a 45° cut or miter is made at its free end. Preferably, a small piece of sealant material 14 is applied to the mitered surface. Then assembly 10 is applied to the marginal edges of the unit by inserting spacer-dehydrator 16 between the peripheral marginal edge portions of the glass sheets 6 and 8 while contemporaneously removing the support for the upper sheet. At the corners, a tool is used to remove approximately a 90° notch from spacer-dehydrator 16. Obviously, at the final corner, in addition to removing a 90° notch from spacer-dehydrator 16, the sealant material 14 and carrier tape or ribbon 12 are also cut or severed from the remaining material on coil 26. After completing this step, the edges of the assembled unit are pressed, as by roll pressing carrier tape 12, to flow out the sealant 14 and obtain the desired hermetic seal.

Although the present invention has been described with particular reference to the specific details of a certain embodiment thereof, it is not intended that such details shall be regarded as limitations upon the scope of the invention except insofar as included in the accompanying claim.

We claim:

1. A method of fabricating multiple glazed units comprising supporting a pair of glass sheets in opposed, spaced, parallel relation to each other, providing a package containing a continuous length of a composite element comprised of an elongated strip of flowable mastic sealant material having a flexible carrier tape adhered to one surface and a resilient spacer-dehydrator element adhered to the opposite surface, removing a segment of said composite element from said package, inserting said spacer-dehydrator element between opposed, peripheral marginal edge portions of said glass sheets with portions of said mastic sealant overlying the edges of said glass sheets and pressing said carrier tape so as to flow said portions of said mastic sealant into hermetically sealing contact with said edges of said glass sheets.

References Cited

UNITED STATES PATENTS

| | | | |
|---|---|---|---|
| 2,525,717 | 10/1950 | Ottenheimer | 156—109 UX |
| 3,468,738 | 9/1969 | Deisenroth | 156—109 |
| 3,473,988 | 10/1969 | Rullier et al. | 156—109 X |
| 2,454,821 | 11/1948 | McKee | 206—56 AB |
| 2,733,789 | 2/1956 | Tolle | 156—109 X |
| 2,974,377 | 3/1961 | Kunkle | 52—616 |
| 3,464,540 | 9/1969 | Stark | 206—46 FC |

CARL D. QUARFORTH, Primary Examiner

E. A. MILLER, Assistant Examiner

U.S. Cl. X.R.

156—292, 295, 309